United States Patent
Bartling et al.

(10) Patent No.: US 11,502,880 B1
(45) Date of Patent: Nov. 15, 2022

(54) BASELINE WANDER CANCELATION

(71) Applicant: Apple Inc., Cupertino, CA (US)

(72) Inventors: Ryan D. Bartling, Sunnyvale, CA (US); Jafar Savoj, Sunnyvale, CA (US); Brian S. Leibowitz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/478,069

(22) Filed: Sep. 17, 2021

(51) Int. Cl.
*H04L 25/03* (2006.01)
*H04L 25/06* (2006.01)
*H04L 7/00* (2006.01)

(52) U.S. Cl.
CPC ...... *H04L 25/03885* (2013.01); *H04L 7/0016* (2013.01); *H04L 25/06* (2013.01)

(58) Field of Classification Search
CPC .. H04L 25/03885; H04L 7/0016; H04L 25/06
See application file for complete search history.

(56) References Cited

U.S. PATENT DOCUMENTS

| | | | |
|---|---|---|---|
| 6,173,019 B1 * | 1/2001 | Hee | H04L 25/03885 375/232 |
| 6,324,232 B1 | 11/2001 | Mirfakhraei | |
| 6,404,829 B1 * | 6/2002 | Sonu | G11B 20/10009 375/345 |
| 9,106,462 B1 * | 8/2015 | Aziz | H04L 25/03057 |
| 9,306,609 B1 | 4/2016 | LaCroix | |
| 9,917,607 B1 | 3/2018 | Zhang et al. | |
| 10,177,945 B1 * | 1/2019 | Zhong | H04L 25/03057 |
| 10,483,952 B1 * | 11/2019 | Su | H04L 25/03878 |
| 10,536,178 B2 * | 1/2020 | Chang | H04L 7/0087 |
| 10,554,449 B1 * | 2/2020 | Ghittori | H04L 25/03057 |
| 2006/0120491 A1 * | 6/2006 | Yen | H03G 3/3089 375/345 |
| 2015/0271048 A1 * | 9/2015 | Zhao | H04L 43/50 370/241 |
| 2016/0080176 A1 * | 3/2016 | Kotagiri | H04L 25/03019 375/232 |

FOREIGN PATENT DOCUMENTS

EP 1172928 A2 * 1/2002 ............. H03D 3/008

* cited by examiner

*Primary Examiner* — Jean B Corrielus
(74) *Attorney, Agent, or Firm* — Kowert, Hood, Munyon, Rankin & Goetzel, P.C.; Dean M. Munyon

(57) ABSTRACT

A receiver converter circuit included in a computer system may receive multiple signals that encode a serial data stream that encode multiple data symbols. To correct for baseline wander, the receiver circuit may generate a disparity signal that is used to control the application of a differential voltage to the multiple signals. The receiver circuit may also employ the disparity signal to generate a gradient against which the magnitude of differential voltage is calibrated.

20 Claims, 10 Drawing Sheets

US 11,502,880 B1

BASELINE WANDER CANCELATION

BACKGROUND

Technical Field

This disclosure relates to the field of high-speed communication interface design and, in particular, to reducing baseline wander.

Description of the Related Art

Computing systems typically include a number of interconnected integrated circuits. In some cases, the integrated circuits may communicate using communication channels or links to transmit and receive data bits. The communication channels may support parallel communication, in which multiple data bits are transmitted in parallel, or serial communication, in which data bits are transmitted one bit at a time in a serial fashion.

The data transmitted between integrated circuits may be encoded to aid in transmission. For example, in the case of serial communication, data may be encoded to provide sufficient transitions between logic states to allow for clock and data recovery circuits to operate. Alternatively, in the case of parallel communication, the data may be encoded to reduce switching noise or to improve signal integrity.

During transmission of the data, the physical characteristics of the communication channel may attenuate a transmitted signal associated with a particular data bit. For example, the impedance of wiring included in the communication channel or link may attenuate certain frequency ranges of the transmitted signal. Additionally, impedance mismatches between wiring included in the communication channel and devices coupled to the communication channel may induce reflections of the transmitted signal, which may degrade subsequently transmitted signals corresponding to other data bits.

SUMMARY OF THE EMBODIMENTS

Various embodiments for correcting baseline wander associated with a plurality of signals that encode a serial data stream consisting of multiple data symbols are disclosed. Broadly speaking, a front-end circuit is configured to generate an equalized signal using the plurality of signals. An analog-to-digital converter circuit is configured to sample, using a recovered clock signal, the equalized signal to generate a plurality of samples. A recovery circuit is configured to generate, using the plurality of samples, the recovered clock signal and a plurality of recovered data symbols. A baseline wander control circuit is configured to generate a disparity signal using the recovered data symbols. The disparity signal is indicative of a difference in respective numbers of logic values included in the plurality of recovered data symbols. The baseline wander control circuit is further configured to generate a gain signal and a control signal using the disparity signal. A digital-to-analog converter circuit is configured to adjust respective input voltage levels of the plurality of signals using the gain signal and the control signal.

DETAILED DESCRIPTION OF EMBODIMENTS

Figure 1:
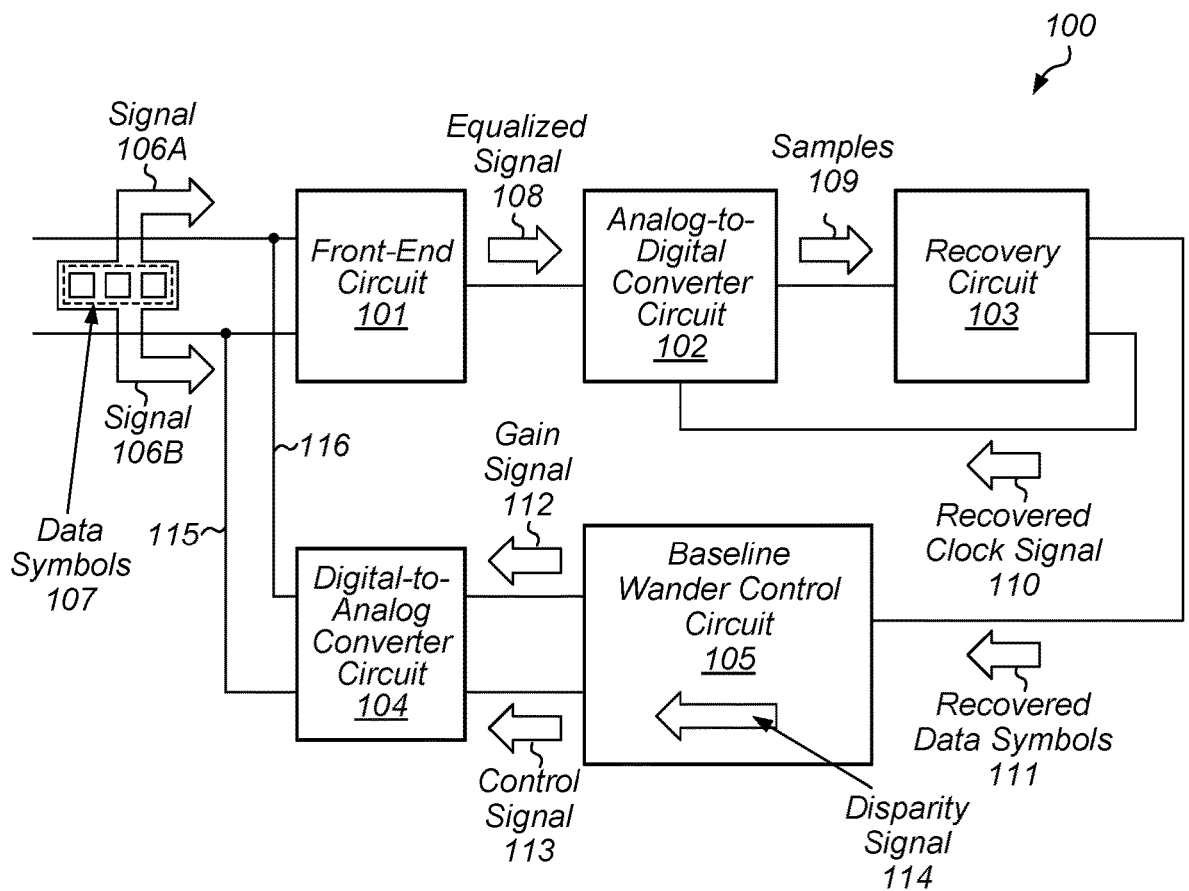
FIG. 1 is a block diagram of an embodiment of a receiver circuit for a computer system.

A computing system may include one or more integrated circuits, such as, e.g., a central processing unit (CPU) and memories. Each one of the integrated circuits of the computing system may communicate through either a serial or parallel interface. In a parallel interface, multiple data bits are communicated simultaneously, while in a serial interface, data is communicated as a series of sequential single data bits. When employing a serial interface to communicate data between two devices included in a computing system, the data may be transmitted according to different protocols. For example, the data may be transmitted using return to zero (RZ), non-return to zero (NRZ), pulse amplitude modulation (PAM), or any suitable combination thereof.

In the computing system, different devices may have different electrical operating parameters. As such, devices may be AC coupled using high-pass filters to a communication channel or link between the devices. The high-pass filters, which can include series capacitors, remove the low-frequency components of the transmitted signals, which results in a low-frequency drift of the received data voltage. Such low-frequency drift (referred to as "baseline wander") is a slow-moving change of a common mode voltage of the signals being transmitted on the communication channel or link.

To determine a value for a given data symbol in a serial data stream, the signals encoded the stream are sampled during a period of time when the given data symbol is value (referred to as a "unit interval"). The shape of the signals during a unit interval is referred to as the "data eye." The more well-defined a difference in the signals is during a unit interval, the higher the probability of correctly determining the value of the corresponding data symbol. Baseline wander can affect the fidelity of the data eye of the transmitted data, making recovery of transmitted data symbols more difficult. The severity of the effect can be a function of various factors including the low-frequency power spectrum density of the received signal ignoring the AC coupling, and the corner frequency of the high-pass filters. The high-pass filters can create residual postcursor energy for several time constants of the high-pass filters, thus making the amount of baseline wander dependent on how many of one value of data symbol are transmitted versus how many of another value are transmitted.

By encoding transmitted data, the number of data symbols of one value may be kept close to the number of data symbols of another value, thereby limiting the amount of baseline wander. Some communication channels or links (e.g., USB or PCIE) do not use such encoding and rely on the baseline wander being statistically bounded, which can allow a statistical approach to remediating the effects of baseline wander.

Such approaches to correct baseline wander rely on accumulating recovered data symbols to determine line or link disparity. As used and defined herein, line disparity (or simply "disparity") refers to a difference between the number of one value of data symbol and the number of another value of data symbol received from a communication channel or link. Determining the disparity can be costly from a circuit area and power perspective, and may involve a long latency before adequate data has been analyzed to correct baseline wander. The embodiments illustrated in the drawings and described below may provide techniques for canceling baseline wander using recovered data symbols and recovered clock information to estimate line disparity, which is then used to adjust the input signal levels. By using such estimation techniques, the efficiency of the baseline wander correction circuits may be improved.

A block diagram depicting an embodiment of a receiver circuit is depicted in FIG. 1. As illustrated, receiver circuit 100 includes front-end circuit 101, analog-to-digital converter circuit 102, recovery circuit 103, digital-to-analog converter circuit 104, and baseline wander control circuit 105.

Front-end circuit 101 is coupled to nodes 115 and 116 and is configured to generate equalized signal 108 using signals 106A and 106B. In various embodiments, signals 106A and 106B may encode a serial data stream that includes data symbols 107. Nodes 115 and 116 may, in some embodiments, be coupled to a transmitter circuit that is configured to generate signals 106A and 106B. In various embodiments, nodes 115 and 116 may form a communication bus or channel that is coupled to front-end circuit 101 via capacitors in an arrangement referred to as "AC coupling."

Analog-to-digital converter circuit 102 is configured to sample, using recovered clock signal 110, equalized signal 108 to generate samples 109. As described below, analog-to-digital converter circuit 102 may include quantizer circuits, sample circuits, or any other suitable combination of circuits that may be employed to sample equalized signal 108.

Recovery circuit 103 is configured to generate, using samples 109, recovered clock signal 110 and recovered data symbols 111. In various embodiments, recovery circuit 103 may be configured to approximate a frequency of recovered clock signal 110. In some cases, recovery circuit 103 may include a phase-locked loop circuit configured to align recovered clock signal 110 to transitions in signals 106A and 106B. In other embodiments, recovery circuit 103 may be configured to perform an error check and/or correction operation on at least a portion of recovered data symbols 111.

In various embodiments, there will be correctable baseline wander residue if the value of the voltage applied to the signals 106A and 106B is not correct. To calibrate the voltage used by digital-to-analog converter circuit 104, baseline wander control circuit 105 is configured to generate disparity signal 114 using recovered data symbols 111. By using disparity signal 114 and errors in the recovery of the clock and data symbols encoded in signals 106A and 106B, baseline wander control circuit 105 can generate a gradient to calibrate the value of the voltage used to correct baseline wander. Baseline wander control circuit 105 is further configured to generate gain signal 112 and control signal 113, which are used to control the operation of digital-to-analog converter circuit 104.

In various embodiments, disparity signal 114 may be indicative of a difference in respective numbers of logic values (e.g., logic-1 or logic-0 values) included in recovered data symbols 111. Baseline wander control circuit 105 is further configured to generate gain signal 112 and control signal 113 using disparity signal 114. It is noted that there is a latency between the determination of disparity signal 114 and the arrival of recovered data symbols 111 or recovered clock signal 110 that have recoverable errors.

Digital-to-analog converter circuit 104 is configured to adjust respective input voltage levels of signals 106A and 106B using gain signal 112 and control signal 113. In various embodiments, digital-to-analog converter circuit 104 is further configured to determine a value for a differential voltage using gain signal 112. For example, gain signal 112 may include multiple bits whose collective value encodes a magnitude of the differential voltage. Digital-to-analog converter circuit 104 may be further configured to generate the differential voltage using the multiple bits included in gain signal 112.

In some embodiments, digital-to-analog converter circuit 104 may also be configured, using control signal 113, to determine a polarity that is used to apply the differential voltage to signals 106A and 106B. Control signal 113 may, in some embodiments, include multiple bits whose collective value is used by digital-to-analog converter circuit 104 to determine how to apply the differential voltage to signals 106A and 106B. For example, in response to a determination that control signal 113 is a particular value, digital-to-analog converter circuit 104 may apply the differential voltage to signal 106A, while, in response to a determination that control signal 113 is a different value, digital-to-analog converter circuit 104 may apply the differential voltage to signal 106B. In some cases, control signal 113 may cause digital-to-analog converter circuit 104 to not apply the differential voltage to either signal 106A or signal 106B. In some embodiments, digital-to-analog converter circuit 104 may be further configured to apply the differential voltage to either of signals 106A or 106B for a particular period of time.

In addition to baseline wander affecting the quality of the data eye, a communication channel or link can also degrade the transmitted signal, making recovery of transmitted data more difficult. One method to compensate for the transfer function of the communication channel or link is to equalize the received signal. Such equalization can be performed using a variety of circuits, such as a continuous-time linear equalizer circuit, a feed-forward equalizer circuit, a decision feedback equalizer circuit, and the like.

Figure 2:
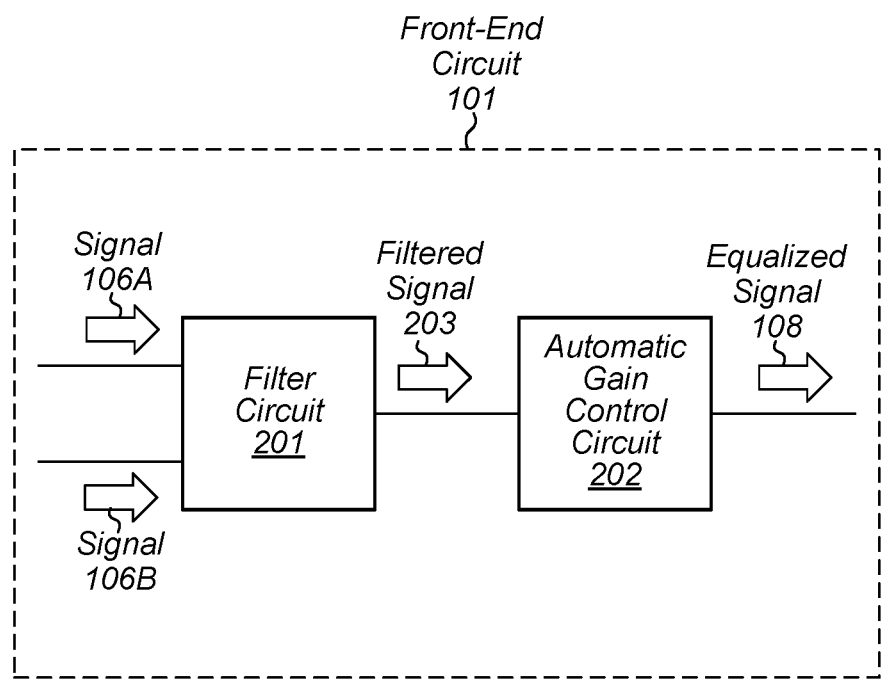
FIG. 2 is a block diagram of an embodiment of an analog front-end circuit.

As described above, front-end circuit 101 is configured to generate equalized signal 108. A block diagram of an embodiment of front-end circuit 101 is depicted in FIG. 2. As illustrated, front-end circuit 101 includes filter circuit 201 and automatic gain control circuit 202. It is noted that although front-end circuit 101 is depicted as being implemented using continuous-time linear equalization techniques, in other embodiments, other equalization techniques may be employed.

Filter circuit 201 is configured to generate filter signal 203 using signals 106A and 106B. In various embodiments, to generate filter signal 203, filter circuit 201 may be further configured to attenuate high-frequency noise in signals 106A and 106B. In some cases, filter circuit 201 may be further configured to attenuate low-frequency components at or near DC levels in signals 106A and 106B.

In various embodiments, filter circuit 201 may be implemented using a series of filter circuits, each with different transfer functions. For example, filter circuit 201 may include three filter circuits. The first filter circuit may be a high-pass filter circuit, while the second and third filters circuits may be bandpass filter circuits. In some embodiments, filter circuit 201 may additionally include a variable gain amplifier circuit coupled to the output of the last of the three filter circuits.

Automatic gain control circuit 202 is configured to generate equalized signal 108 using filtered signal 203. In various embodiments, automatic gain control circuit 202 may be implemented as a closed-loop control circuit that uses feedback derived from equalized signal 108 to maintain the amplitude of the data symbols at an optimum level for sampling. In various embodiments, automatic gain control circuit 202 may include any suitable combination of attenuator and amplifier circuits that can be dynamically activated or de-activated to maintain the amplitude of the data symbols.

It is noted that although front-end circuit 101 is depicted as including filter circuit 201 and automatic gain control circuit 202, when different equalization techniques are employed, different circuit blocks may be included.

Figure 3:
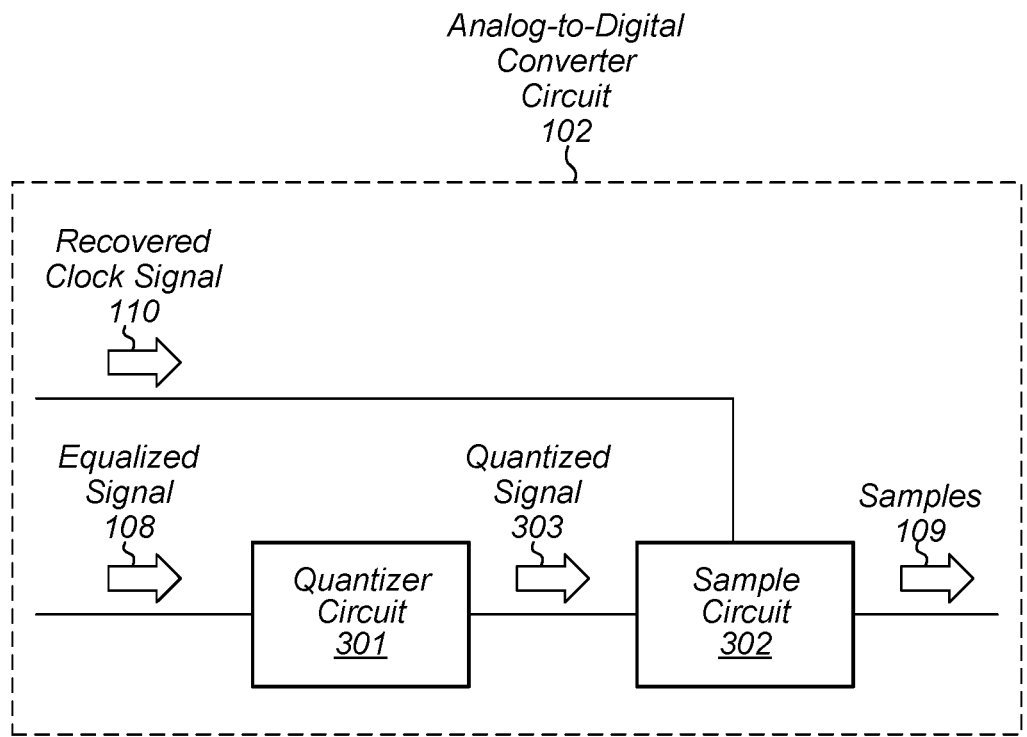
FIG. 3 is a block diagram of an embodiment of an analog-to-digital converter circuit.

A block diagram of analog-to-digital converter circuit 102 is depicted in FIG. 3. As illustrated, analog-to-digital converter circuit 102 includes quantizer circuit 301 and sample circuit 302.

Quantizer circuit 301 is configured to generate quantized signal 303 using equalized signal 108. To generate quantized signal 303, quantizer circuit 301 may be configured to compare equalized signal 108 to a set of voltage levels and select a particular one of the set of voltage levels that most closely matches the voltage level of equalized signal 108. In various embodiments, a value of quantized signal 303 may continuously change as the voltage level of equalized signal 108 varies. Quantized signal 303 may, in some embodiments, include multiple bits whose collective value corresponds to the particular one of the set of voltage levels that is selected at any given time. In various embodiments, quantizer circuit 301 may be implemented using a resistive voltage divider ladder circuit configured to generate the set of voltage levels.

Sample circuit 302 is configured to generate samples 109 using quantized signal 303 and recovered clock signal 110. To generate samples 109, sample circuit 302 is further configured to capture a state of quantized signal 303 in response to an activation of recovered clock signal 110. In various embodiments, sample circuit 302 may be implemented using one or more latch circuit, flip-flop circuits, or any other suitable circuit configured to store a voltage indicative of a bit.

It is noted that the types and arrangement of circuit blocks depicted in the embodiment of FIG. 3 is an example. In other embodiments, analog-to-digital converter circuit 102 may be implemented using any suitable analog-to-digital converter technique.

As used herein, when a signal is activated, it is set to a logic or voltage level that activates a load circuit or device. The logic level may be either a high logic level or a low logic level depending on the load circuit. For example, an active state of a signal coupled to a p-channel metal-oxide semiconductor field-effect transistor (MOSFET), Fin field-effect transistor (FinFET), or gate-all-around field-effect transistor (GAAFET) is a low logic level (referred to as an "active low signal"), while an active state of a signal coupled to an n-channel MOSFET, FinFET, or GAAFET is a high logic level (referred to as an "active high signal").

Figure 4:
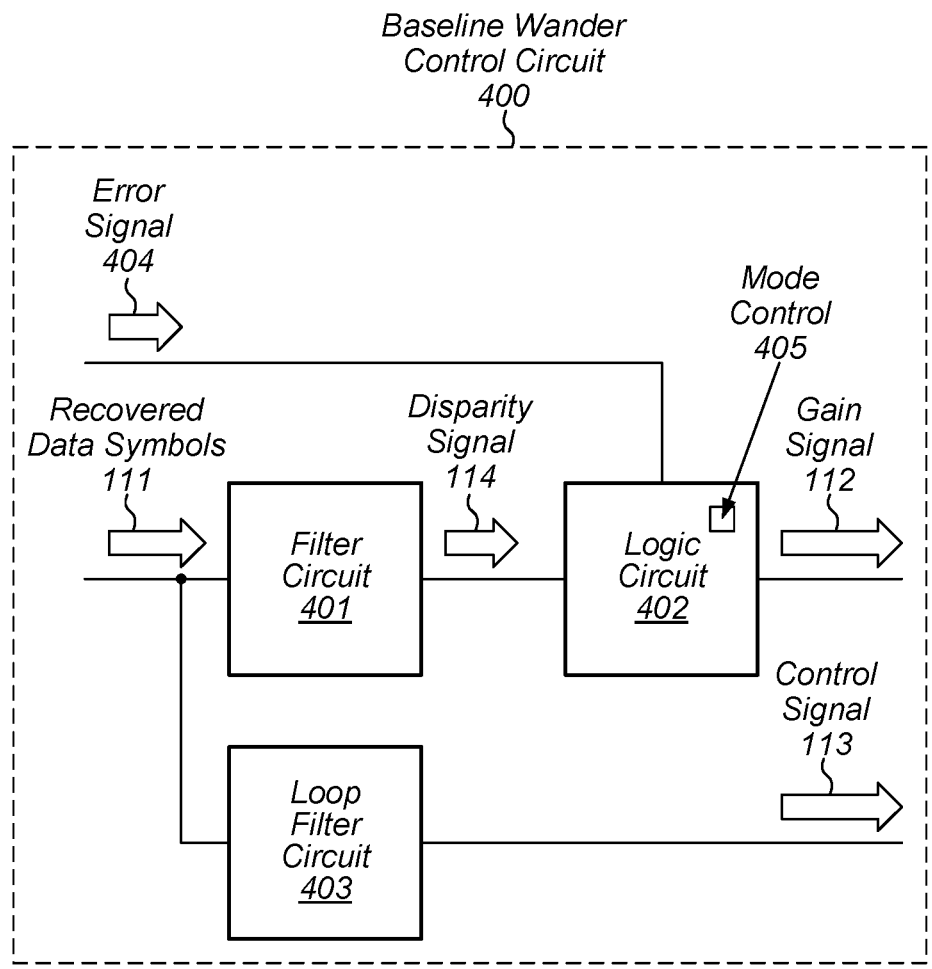
FIG. 4 is block diagram depicting an embodiment of a baseline wander control circuit.

Turning to FIG. 4, a block diagram of an embodiment of a baseline wander control circuit is depicted. As illustrated, baseline wander control circuit 400 includes filter circuit 401, logic circuit 402, and loop filter circuit 403.

Filter circuit 401 is configured to generate disparity signal 114 using recovered data symbols 111. To generate disparity signal 114, filter circuit 401 may be further configured to perform a digital filter operation on recovered data symbols 111. For example, filter circuit 401 may be configured to perform an infinite impulse response filter operation on recovered data symbols 111. In various embodiments, filter circuit 401 may be implemented using any suitable combination of sequential and combinatorial logic gates.

Logic circuit 402 is configured to generate gain signal 112 using disparity signal 114. To generate gain signal 112, logic circuit 402 may be further configured to combine error signal 404 with disparity signal 114. In various embodiments, error signal 404 is indicative of a number of errors detected during the generation of recovered data symbols 111 from samples 109.

To generate gain signal 112, logic circuit 402 is further configured to generate a parameter later multiplied by error signal 404 and accumulate the product. Arbitrary delays can be applied to the parameter or error signal 404 before any accumulation occurs. The method by which the product is generated is dependent upon an operating mode of logic circuit 402. In one operating mode, logic circuit 402 is configured to compare disparity signal 114 to a plurality of threshold values that include a positive threshold value and a negative threshold value, and generate the parameter based on this comparison. For example, in some embodiments, logic circuit 402 is configured to set the parameter to '1' in response to a determination that disparity signal 114 is above the threshold value, to set the parameter to '−1' in response to a determination that disparity signal 114 is less than the negative threshold value, and set the parameter to '0' in response to a determination that disparity signal 114 is within the range between the positive threshold value and the negative threshold value.

In a second operating mode, logic circuit 402 is also configured to compare disparity signal 114 to the positive threshold value, and determine the value of the parameter based on results of the comparison. For example, in some embodiments, logic circuit 402 is configured to set the parameter to the disparity signal, or a filtered disparity signal, in response to a determination that disparity signal 114 is above the positive threshold value or below the negative threshold value. The parameter is set to '0' in response to a determination that disparity signal 114 is within the range of between the positive threshold value and the negative threshold value.

In a third operating mode, logic circuit 402 is configured to set the parameter to the value of disparity signal 114. In a fourth operating mode, logic circuit 402 is configured to set the parameter to a sign of disparity signal 114. It is noted that mode control 405 may be programmable during operation of receiver circuit 100, or may be set during an initialization of receiver circuit 100. While only four operating modes are described for logic circuit 402, in other embodiments, additional operating modes are possible and contemplated.

Loop filter circuit 403 is configured to generate control signal 113 using recovered data symbols 111. To generate control signal 113, loop filter circuit 403 may be further configured to compare a running disparity value to a plurality of threshold values. In various embodiments, the running disparity value is based on recovered data symbols 111. Respective values for the plurality of threshold values may, in some embodiments, be programmable based on characteristics of the communication channel or link, the communication protocol being employed, or any other suitable characteristic.

In some embodiment, loop filter circuit 403 may be further configured, in response to a determination that the running disparity value is greater than a particular threshold value of the plurality of threshold values, to set control signal 113 to a particular value in order to activate digital-to-analog converter circuit 104. Control signal 113 may, in some embodiments, include multiple bits and the particular value may cause digital-to-analog converter circuit 104 to apply, with a particular polarity, a differential voltage to the signals 106A and 106B for a given period of time. In some cases, the given period of time may correspond to a period of time during which a byte of information may be received by receiver circuit 100.

Loop filter circuit 403 may be further configured, in response to a determination that the running disparity value is less than a different threshold value of the plurality of threshold values, to set control signal 113 to a different value, that causes digital-to-analog converter circuit 104 to apply, with a different polarity, the differential voltage to the signals 106A and 106B for the given period of time.

In various embodiments, loop filter circuit 403 may include an accumulator circuit that is used to determine the running disparity value. As additional recovered data symbols 111 are received, loop filter circuit 403 is configured to increase or decrease a value of the accumulator circuit. In some embodiments, loop filter circuit 403 may be configured to increase or decrease the value of the accumulator circuit by one while, in other embodiments, loop filter circuit 403 may be configured to increase or decrease the value of the accumulator circuit by a value greater than one.

Loop filter circuit 403 may be further configured to reset a value of the accumulator circuit, in response to the determination that the running disparity magnitude is greater than the threshold value. In cases where the value of the accumulator circuit is incremented or decremented by one, loop filer 403 is further configured to reset the accumulator value to zero as part of an "accumulate and dump" operation. In cases where the value of the accumulator circuit is incremented or decremented by a value greater than one, the magnitude of the accumulator can exceed the particular threshold value before being reset. When this occurs, it is desirable to keep track of the amount that the magnitude of the accumulator circuit exceeds the particular threshold value. Accordingly, logic circuit 403 is configured to, in response to a determination that the magnitude of the accumulator circuit is greater than the threshold value, to add or subtract the particular threshold value from the value of the accumulator circuit, causing the magnitude of the accumulator circuit to be decreased.

It is noted that although baseline wander control circuit 400 is depicted as using recovered data symbols 111 to generate disparity signal 114, in other embodiments, baseline wander control circuit 400 may employ recovered clock signal 110 to generate disparity signal 114. In such cases, error signal 404 may correspond to errors detected during the recovery of recovered clock signal 110.

Figure 5:
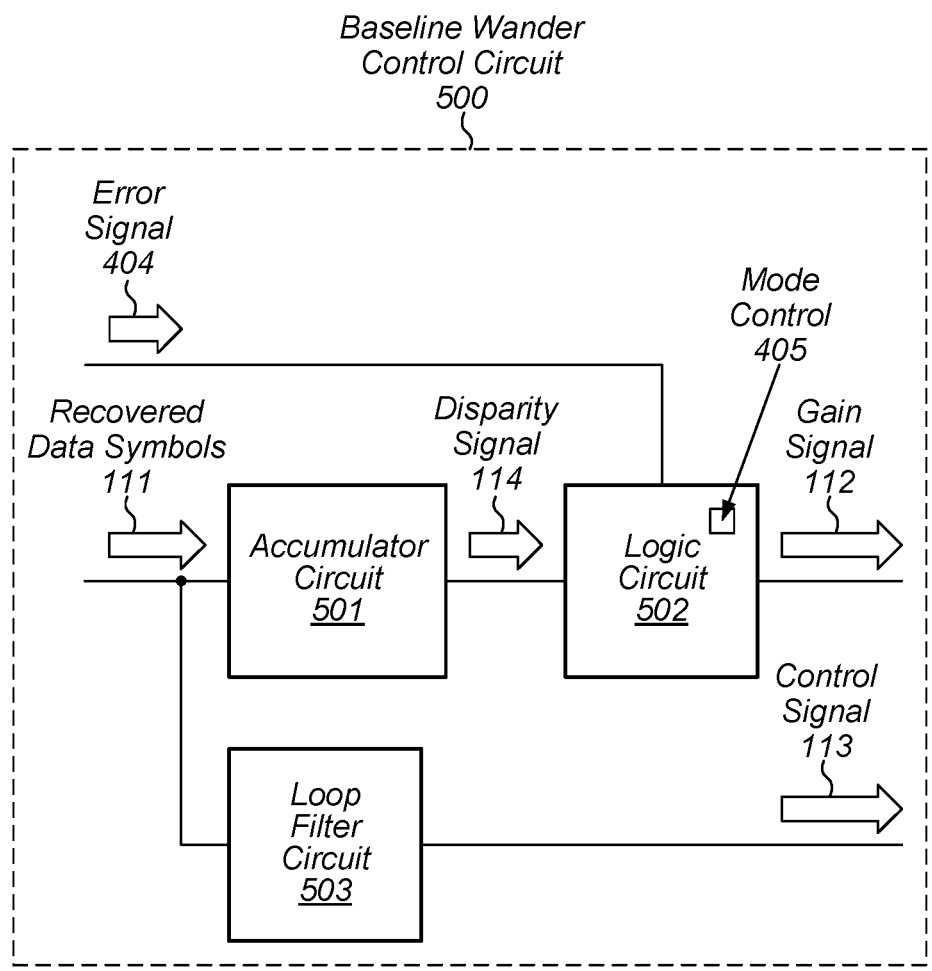
FIG. 5 is a block diagram of another embodiment of a baseline wander control circuit.

Turning to FIG. 5, a block diagram of another embodiment of a baseline wander control circuit is depicted. As illustrated, baseline wander control circuit 500 includes accumulator circuit 501, logic circuit 502, and loop filter circuit 503.

Accumulator circuit 501 is configured generate disparity signal 114 using recovered data symbols 111. In various embodiments, to generate disparity signal 114, accumulator circuit 501 may be further configured to perform a rolling accumulation of different logic values included in recovered data symbols 111, and combine the accumulated number of the different logic values to generate disparity signal 114. Accumulator circuit 501 may, in some embodiments, be implemented using counter circuits or other suitable sequential logic circuits configured to track numbers of the different logic values in recovered data symbols 111.

Logic circuit 502 is configured to generate gain signal 112 using disparity signal 114. To generate gain signal 112, logic circuit 502 is further configured to generate a parameter later multiplied by error signal 404 and accumulate the product. Arbitrary delays can be applied to the parameter or error signal 404 before any accumulation occurs. The method by which the product is generated is dependent upon an operating mode of logic circuit 502. In one operating mode, logic circuit 502 is configured to compare disparity signal 114 to a plurality of threshold values that include a positive threshold value and a negative threshold value, and generate the parameter based on this comparison. For example, in some embodiments, logic circuit 502 is configured to set the parameter to '1' in response to a determination that disparity signal 114 is above the threshold value, to set the parameter to '−1' in response to a determination that disparity signal 114 is less than the negative threshold value, and set the parameter to '0' in response to a determination that disparity signal 114 is within the range between the positive threshold value and the negative threshold value.

In a second operating mode, logic circuit 502 is also configured to compare disparity signal 114 to the positive threshold value, and determine the value of the parameter based on results of the comparison. For example, in some embodiments, logic circuit 502 is configured to set the parameter to the disparity signal, or a filtered disparity signal, in response to a determination that disparity signal 114 is above the positive threshold value or below the negative threshold value. The parameter is set to '0' in response to a determination that disparity signal 114 is within the range of between the positive threshold value and the negative threshold value.

In a third operating mode, logic circuit 502 is configured to set the parameter to the value of disparity signal 114. In a fourth operating mode, logic circuit 502 is configured to set the parameter to a sign of disparity signal 114. It is noted that mode control 405 may be programmable during operation of receiver circuit 100, or may be set during an initialization of receiver circuit 100. While only four operating modes are described for logic circuit 502, in other embodiments, additional operating modes are possible and contemplated.

In some embodiments, loop filter circuit 503 may be further configured, in response to a determination that the running disparity value is greater than a particular threshold value of a plurality of threshold values, to set control signal 113 to a particular value to activate digital-to-analog converter circuit 104. Control signal 113 may, in some embodiments, include multiple bits and the particular value may cause digital-to-analog converter circuit 104 to apply, with a particular polarity, a differential voltage to the signals 106A and 106B for a given period of time. In some cases, the given period of time may correspond to a period of time during which a byte of information may be received by receiver circuit 100.

Loop filter circuit 503 may be further configured, in response to a determination that the running disparity value is less than a different threshold value of a plurality of threshold values, to set control signal 113 to a different value that causes digital-to-analog converter circuit 104 to apply, with a different polarity, the differential voltage to the signals 106A and 106B for the given period of time.

In various embodiments, loop filter circuit 503 may include an accumulator circuit that is used to determine the running disparity value. As additional recovered data symbols 111 are received, loop filter circuit 503 is configured to increase or decrease a value of the accumulator circuit. In some embodiments, loop filter circuit 503 may be configured to increase or decrease the value of the accumulator circuit by one while, in other embodiments, loop filter circuit 503 may be configured to increase or decrease the value of the accumulator circuit by a value greater than one.

Loop filter circuit 503 may be further configured to reset a value of the accumulator circuit, in response to the determination that the running disparity magnitude is greater than the particular threshold value. In cases where the value of the accumulator circuit is incremented or decremented by one, loop filer 503 is further configured to reset the accumulator value to zero as part of an "accumulate and dump" operation. In cases where the value of the accumulator circuit is incremented or decremented by a value greater than one, the magnitude of the accumulator can exceed the threshold value before being reset. When this occurs, it is desirable to keep track of the amount that the magnitude of the accumulator circuit exceeds the particular threshold value. Accordingly, logic circuit 503 is configured to, in response to a determination that the magnitude of the accumulator circuit is greater than the threshold value, to add or subtract the particular threshold value from the value of the accumulator circuit causing the magnitude of the accumulator circuit to be decreased.

It is noted that although baseline wander control circuit 500 is depicted as using recovered data symbols 111 to generate disparity signal 114, in other embodiments, baseline wander control circuit 500 may employ recovered clock signal 110 to generate disparity signal 114. In such cases, error signal 404 may correspond to errors detected during the recovery of recovered clock signal 110.

Figure 6:
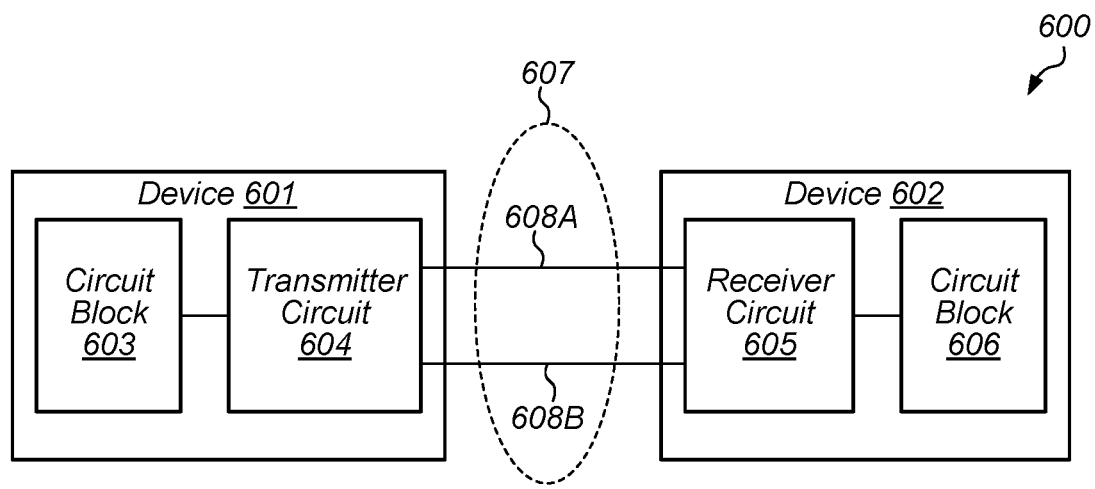
FIG. 6 is a block diagram of a computer system that includes a transmitter circuit and a receiver circuit.

As described above, a receiver circuit, such as receiver circuit 100, may be employed in a computer system. A block diagram of an embodiment of such a computer system is depicted in FIG. 6. As illustrated, computer system 600 includes devices 601 and 602, coupled by communication bus 607.

Device 601 includes circuit block 603 and transmitter circuit 604. In various embodiments, device 601 may be a processor circuit, a processor core, a memory circuit, or any other suitable circuit block that may be included on an integrated circuit in a computer system. It is noted that although device 601 only depicts a single circuit block and a single transmitter circuit, in other embodiments, additional circuit blocks and additional transmitter circuits may be employed.

Transmitter circuit 604 is configured to serially transmit signals, via communication bus 607, corresponding to data received from circuit block 603. Such signals may differentially encode one or more bits such that a difference between the respective voltage levels of wires 608A and 608B, at particular point in time, correspond to a particular bit value. In some cases, the generation of the signals may include encoding the bits prior to transmission. It is noted that although communication bus 607 is depicted as including two wires, in other embodiments, any suitable number of wires may be employed.

Device 602 includes receiver circuit 605 and circuit block 606. Like device 601, device 602 may be a processor circuit, a processor core, a memory circuit, or any other suitable circuit block configured to receive data from transmitter circuit 604. In various embodiments, receiver circuit 605 may correspond to receiver circuit 100 as depicted in FIG. 1, and may be subject to the effects of baseline wander. To remediate such effects, receiver circuit 605 may employ one or more of the techniques discussed above in regard to receiver circuit 100.

Devices 601 and 602 may, in some embodiments, be fabricated on a common integrated circuit. In other embodiments, devices 601 and 602 may be located on different integrated circuits mounted on a common substrate or circuit board. In such cases, communication bus 607 may include metal or other conductive traces on the substrate or circuit board. Although only two devices are depicted in computer system 600, in other embodiments, any suitable number of devices may be employed.

Figure 7:
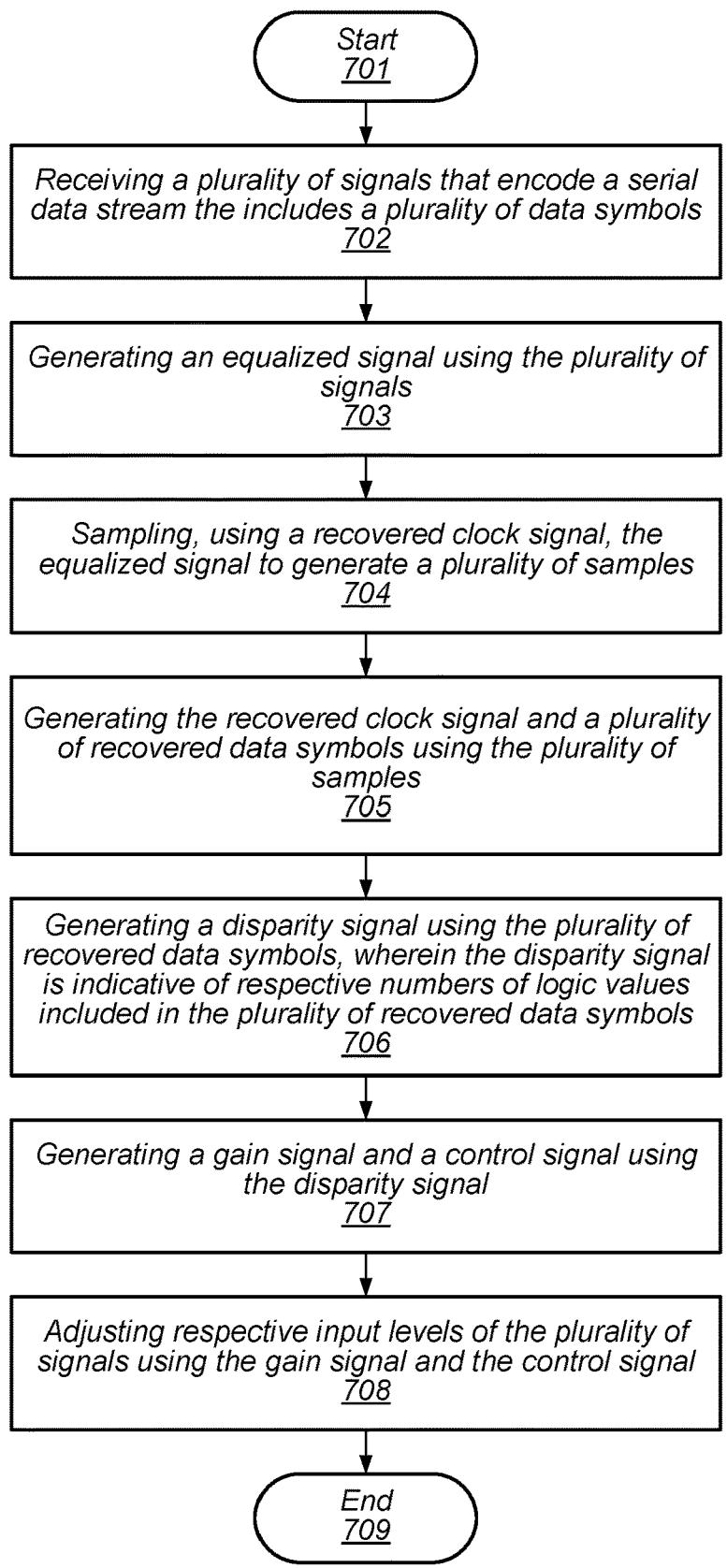
FIG. 7 is a flow diagram of an embodiment of a method for correcting baseline wander in a receiver circuit.

Turning to FIG. 7, a flow diagram depicting an embodiment of a method for correcting baseline wander in a receiver circuit is illustrated. The method, which may be applied to various receiver circuits, including receiver circuit 100 as depicted in FIG. 1, begins in block 701.

The method includes receiving a plurality of signals that encode a serial data stream that includes a plurality of data symbols (block 702). In some embodiments, a value of a particular data symbol of the plurality of data symbols may be encoded as a difference between respective voltage levels of a first signal of the plurality of signals and a second signal of the plurality of signals. It is noted that the plurality of signals may be received via a communication channel or link that includes multiple wires or conductive traces through which the plurality of signals propagates.

The method further includes generating an equalized signal using the plurality of signals (block 703). In various embodiments, generating the equalized signal may include filtering the plurality of signals to generate a filtered signal. In some cases, filtering the plurality of signals includes performing a continuous-time linear equalization operation that attenuates low-frequency components of the plurality of signals. The method can also include adjusting a magnitude of the filtered signal using an automatic gain control circuit.

The method also includes sampling, using a recovered clock signal, the equalized signal to generate a plurality of samples (block 704). In various embodiments, the sampling may be performed by one or more analog-to-digital converter circuits. The method may, in some embodiments, further includes quantizing, by an analog-to-digital converter circuit, the equalized signal to select a particular one of a set of possible values corresponding to a current value of the equalized signal. The method may also include sampling the particular one of the set of possible values.

The method further includes generating the recovered clock signal and a plurality of recovered data symbols using the plurality of samples (block 705). In some embodiments, generating the recovered clock signal includes approximating a frequency of the recovered clock signal and then aligning the recovered clock signal to transitions in the received serial data stream using a phase-locked loop circuit. Alternatively, the method may include oversampling the equalized signal to generate the plurality of samples. In some embodiments, generating the plurality of recovered data symbols includes performing error checking and correction operations on at least a portion of the plurality of recovered data symbols.

The method also includes generating a disparity signal using the plurality of recovered data symbols (block 706). In various embodiments, the disparity signal is indicative of a respective number of logic values included in the plurality of recovered data symbols. In some embodiments, generating the disparity signal includes accumulating the respective numbers included in the plurality of recovered data symbols in a rolling fashion. In other embodiments, generating the disparity signal includes performing an infinite impulse response filtering operation on at least a portion of the plurality of recovered data symbols.

The method further includes generating a gain signal and a control signal using the disparity signal (block 707). In some embodiments, generating the gain signal includes combining the disparity signal with information indicative of errors detected during the generation of the plurality of recovered data symbols. In other embodiments, generating the gain signal includes combining a sign of the disparity signal with the information indicative of errors detected during the generation of the plurality of recovered data symbols.

As described above, the control signal may include multiple bits, whose collective value may be determined in a variety of ways. In some embodiments, generating the control signal includes comparing the disparity signal to a threshold value. In such cases, the method may further include, in response to determining that a value of the disparity signal is greater than the threshold value, setting the control signal to a first value, else setting the control signal to a second value.

The method also includes adjusting respective input levels of the plurality of signals using the gain signal and the control signal (block 708). In some embodiments, adjusting the respective input levels includes determining a differential voltage level using the gain signal, and applying, based on the control signal, the differential voltage to the plurality of signals. The method concludes in block 709.

Figure 8:
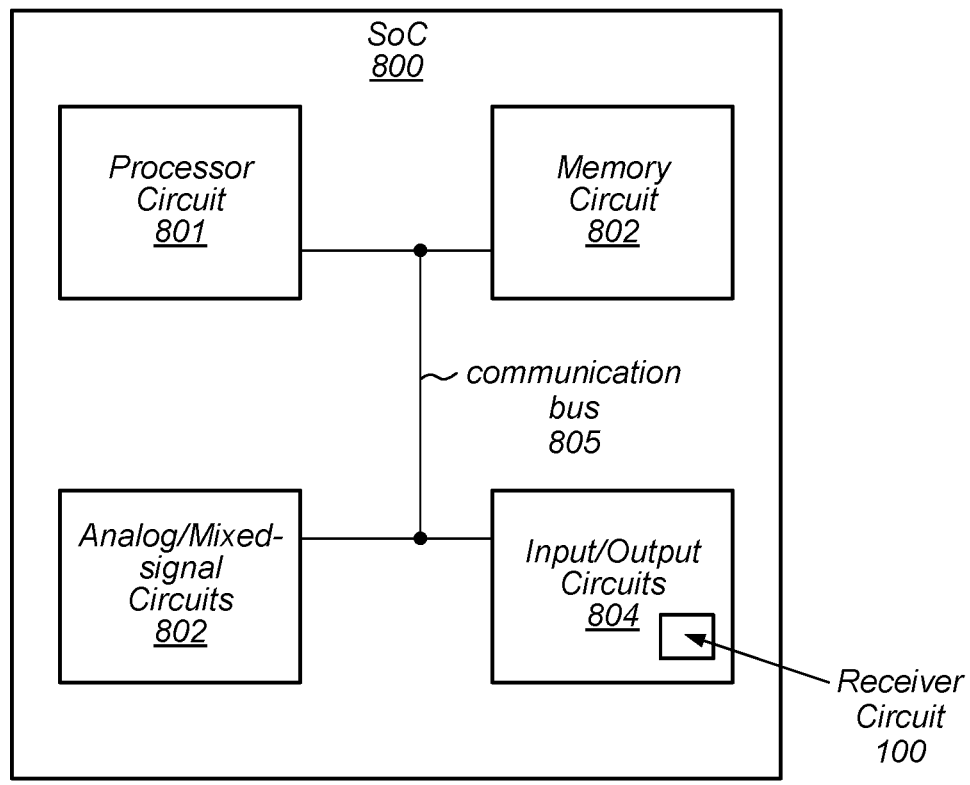
FIG. 8 is a block diagram of an embodiment of a system-on-a-chip that includes a power management circuit.

A block diagram of a system-on-a-chip (SoC) is illustrated in FIG. 8. In the illustrated embodiment, SoC 800 includes processor circuit 801, memory circuit 802, analog/mixed-signal circuits 803, and input/output circuits 804 each of which is coupled to communication bus 805. In various embodiments, SoC 800 may be configured for use in a desktop computer, server, or in a mobile computing application such as, e.g., a tablet, laptop computer, or wearable computing device.

Processor circuit 801 may, in various embodiments, be representative of a general-purpose processor that performs computational operations. For example, processor circuit 801 may be a central processing unit (CPU) such as a microprocessor, a microcontroller, an application-specific integrated circuit (ASIC), or a field-programmable gate array (FPGA).

Memory circuit 802 may, in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 8, in other embodiments, any suitable number of memory circuits may be employed.

Analog/mixed-signal circuits 803 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 803 may be configured to perform power management tasks with the inclusion of on-chip power supplies and voltage regulators.

Input/output circuits 804 may be configured to coordinate data transfer between SoC 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol, and include receiver circuit 100 as depicted in the embodiment of FIG. 1.

Input/output circuits 804 may also be configured to coordinate data transfer between SoC 800 and one or more devices (e.g., other computing systems or integrated circuits) coupled to SoC 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Figure 9:
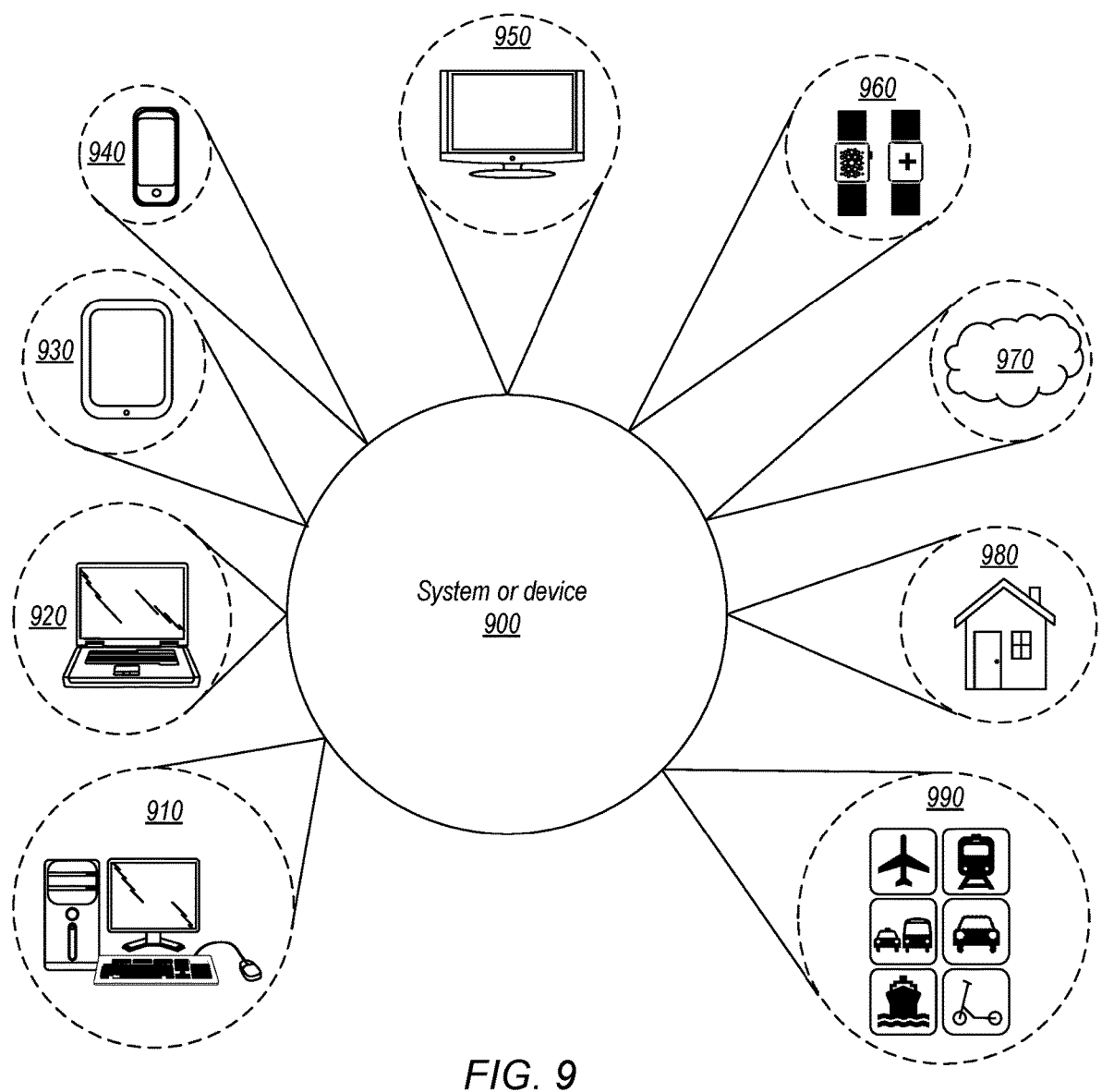
FIG. 9 is a block diagram of various embodiments of computer systems that may include power converter circuits.

Turning now to FIG. 9, various types of systems that may include any of the circuits, devices, or systems discussed above are illustrated. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Figure 10:
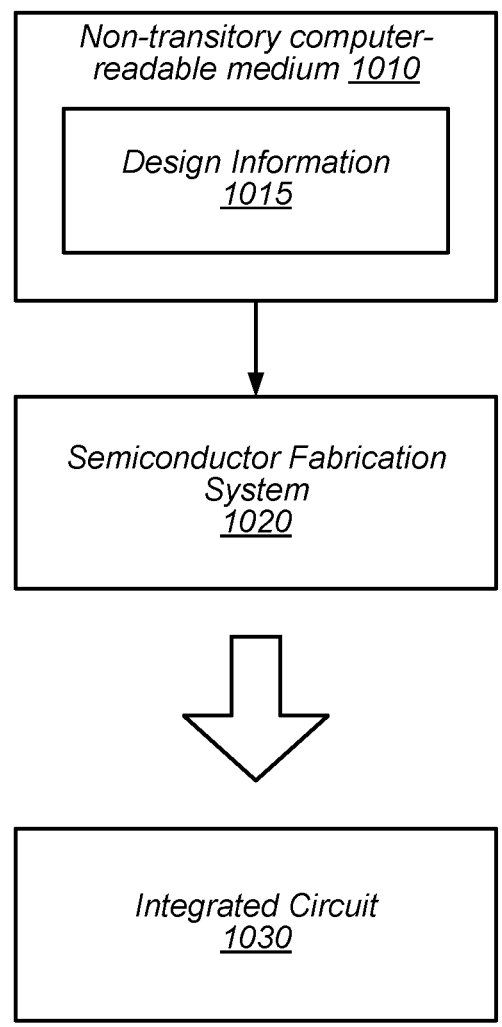
FIG. 10 illustrates an example of a non-transitory computer-readable storage medium that stores circuit design information.

FIG. 10 is a block diagram illustrating an example of a non-transitory computer-readable storage medium that stores circuit design information, according to some embodiments. In the illustrated embodiment, semiconductor fabrication system 1020 is configured to process the design information 1015 stored on non-transitory computer-readable storage medium 1010 and fabricate integrated circuit 1030 based on the design information 1015.

Non-transitory computer-readable storage medium 1010 may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums, which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a front-end circuit configured to generate an equalized signal using a plurality of signals that encode a serial data stream that includes a plurality of data symbols;
   an analog-to-digital converter circuit configured to sample, using a recovered clock signal, the equalized signal to generate a plurality of samples;
   a recovery circuit configured to generate, using the plurality of samples, the recovered clock signal and a plurality of recovered data symbols;
   a baseline wander control circuit configured to:
      generate a disparity signal using the recovered data symbols, wherein the disparity signal is indicative of a difference in respective numbers of logic values included in the plurality of recovered data symbols; and
      generate a gain signal and a control signal using the disparity signal; and
   a digital-to-analog converter circuit configured to adjust respective input voltage levels of the plurality of signals using the gain signal and the control signal.

2. The apparatus of claim 1, wherein to generate the disparity signal, the baseline wander control circuit is further configured to accumulate respective numbers of logic values included in the plurality of recovered data symbols.

3. The apparatus of claim 1, wherein to generate the disparity signal, the baseline wander control circuit is further configured to perform an infinite impulse response filtering operation on at least a portion of the plurality of recovered data symbols.

4. The apparatus of claim 1, wherein to adjust the respective input voltage levels of the plurality of signals, the digital-to-analog converter circuit is further configured to:
   select a magnitude of a differential voltage level using the gain signal; and
   couple, based on the control signal, the differential voltage level to at least one input of the front-end circuit.

5. The apparatus of claim 1, wherein to generate the control signal, the baseline wander control circuit is further configured to:

perform a comparison of a running disparity and a plurality of threshold values, wherein the running disparity is based on the plurality of recovered data symbols; and generate the control signal based on results of the comparison.

6. The apparatus of claim 1, wherein to generate the gain signal, the baseline wander control circuit is further configured to:

perform a comparison of the disparity signal and a plurality of threshold values; and multiply, based on results of the comparison, information indicative of errors detected during the generation of the plurality of recovered data symbols with the disparity signal or a filtered disparity signal.

7. A method, comprising:

receiving a plurality of signals that encode a serial data stream that includes a plurality of data symbols;

generating an equalized signal using the plurality of signals;

sampling, using a recovered clock signal, the equalized signal to generate a plurality of samples;

generating the recovered clock signal and a plurality of recovered data symbols using the plurality of samples;

generating a disparity signal using the recovered data symbols, wherein the disparity signal is indicative of a difference in respective numbers of logic values included in the plurality of recovered data symbols; and generating a gain signal and a control signal using the disparity signal; and adjusting respective input voltage levels of the plurality of signals using the gain signal and the control signal.

8. The method of claim 7, wherein generating the disparity signal includes accumulating the respective numbers of logic values included in the plurality of recovered data symbols in a rolling fashion.

9. The method of claim 7, wherein generating the disparity signal includes performing an infinite impulse response filtering operation on at least a portion of the plurality of recovered data symbols.

10. The method of claim 7, wherein generating the gain signal includes combining the disparity signal with information indicative of errors generated during the generation of the plurality of recovered data symbols.

11. The method of claim 10, wherein adjusting the respective input voltage levels of the plurality of signals includes:

determining a differential voltage level using the gain signal; and applying, based on the control signal, the differential voltage level to the plurality of signals.

12. The method of claim 7, wherein generating the control signal includes:

performing a comparison of a running disparity and a plurality of threshold values, wherein the running disparity is based on the plurality of recovered data symbols; and generating the control signal based on results of the comparison.

13. The method of claim 7, wherein generating the gain signal includes:

performing a comparison of the disparity signal and a plurality of threshold values; and multiplying, based on results of the comparison, information indicative of errors detected during the generation of the plurality of recovered data symbols by zero.

14. An apparatus, comprising:

a first device configured to transmit a plurality of signals that encodes a serial data stream that includes a plurality of data symbols; and a second device configured to:

receive the plurality of signals;

generate an equalized signal using the plurality of signals;

sample, using a recovered clock signal, the equalized signal to generate a plurality of samples;

generate the recovered clock signal and a plurality of recovered data symbols using the plurality of samples;

generate a disparity signal using the recovered data symbols, wherein the disparity signal is indicative of a difference in respective numbers of different logic values in the plurality of recovered data symbols;

generate a gain signal and a control signal using the disparity signal; and adjust respective input voltage levels of the plurality of signals using the gain signal and the control signal.

15. The apparatus of claim 14, wherein to generate the disparity signal, the second device is further configured to accumulate respective numbers of logic values included in the plurality of recovered data symbols.

16. The apparatus of claim 14, wherein to generate the disparity signal, the second device is further configured to perform an infinite impulse response filtering operation on at least a portion of the plurality of recovered data symbols.

17. The apparatus of claim 14, wherein to generate the gain signal, the second device is further configured to generate the gain signal using a combination of the disparity signal with errors associated with the plurality of recovered data symbols.

18. The apparatus of claim 17, wherein to adjust the respective input voltage levels of the plurality of signals, the second device is further configured to:

determine a differential voltage level using the gain signal; and apply, based on the control signal, the differential voltage level to the plurality of signals.

19. The apparatus of claim 14, wherein to generate the control signal, the second device is further configured to:

perform a comparison of a running disparity and a plurality of threshold values, wherein the running disparity is based on the plurality of recovered data symbols; and generate the control signal based on results of the comparison.

20. The apparatus of claim 14, wherein to generate the gain signal, the second device is further configured to:

perform a comparison of the disparity signal and plurality of threshold values; and multiply, based on results of the comparison, the information indicative of errors detected during the generation of the plurality of recovered data symbols by 1.

* * * * *